Sept. 8, 1959 — G. E. GRINDROD — 2,903,367
METHOD FOR STERILIZING SURFACES OF FOOD MATERIALS
Filed June 27, 1955 — 6 Sheets-Sheet 3

INVENTOR.
GEORGE E. GRINDROD
BY Wheeler, Wheeler + Wheeler
ATTORNEYS

Sept. 8, 1959  G. E. GRINDROD  2,903,367
METHOD FOR STERILIZING SURFACES OF FOOD MATERIALS
Filed June 27, 1955  6 Sheets-Sheet 4

INVENTOR.
GEORGE E. GRINDROD
BY
Wheeler, Wheeler & Wheeler
ATTORNEYS

Sept. 8, 1959  G. E. GRINDROD  2,903,367
METHOD FOR STERILIZING SURFACES OF FOOD MATERIALS
Filed June 27, 1955  6 Sheets-Sheet 5

INVENTOR.
GEORGE E. GRINDROD
BY
Wheeler, Wheeler & Wheeler
ATTORNEYS

United States Patent Office 2,903,367
Patented Sept. 8, 1959

2,903,367

METHOD FOR STERILIZING SURFACES OF FOOD MATERIALS

George E. Grindrod, Oconomowoc, Wis.

Application June 27, 1955, Serial No. 518,087

8 Claims. (Cl. 99—162)

This invention realtes to a method for sterilizing surfaces of food materials. This application is a continuation in part of, and contains claims taken from, my prior application Ser. No. 445,020, filed July 22, 1954.

It is a particular object of the present invention to increase the effectiveness of all sterilizing procedures for killing mold by applying sterilizing treatment in a manner correlated as to time and temperature with a newly discovered cycle of susceptibility. I have discovered that at certain periods within this cycle sterilization becomes difficult or impossible, whereas at other periods in the cycle sterilization is so easy that it may be accomplished with minimum treatment to avoid possible injury to the food product under treatment. Reference will be made hereinafter to mold spores only. Sterilization may be effected either during or after packaging but is particularly significant when the food product is completely packaged and even boxed, since it is possible to effect complete sterilization of the food surfaces even under these conditions.

The process is primarily adapted to the sterilization of the surfaces of solid and semi-solid food products wrapped in plastic or natural or synthetic rubber-like membranes where destruction of mold and other contamination of the surface is required. Typical products are cheese and meats. Cheese has been selected to exemplify the invention throughout the present disclosure.

There are many features which may optionally be used. These will all be described in general terms, after which explanation of the theory and results will be given in connection with a more detailed description.

Fundamentally, the food product to be treated is wrapped in a membrane and subjected to a very high degree of vacuum which removes air and other contained gases from cavities within the product and from absorption in the material itself. High vacuum, for my purposes means that the absolute pressure left around the product must be less than the vapor pressure of the product by a substantial margin, so that the product boils, or evolves water. The numerical values of absolute pressures maintained are given more specifically hereinafter. The surface is then subjected to controlled and instantaneous application of heat, usually at sterilizing temperatures.

In the case of cheese, contamination ordinarily occurs when the cured or partially cured cheese is cut or sliced. Hence, it is a simple matter to determine the time of contamination upon which the above periods are based. It is found that if the sterilizing treatment is deferred appreciably beyond thirty-two hours, the organisms cannot be killed within any temperatures to which the cheese may be subjected and still remain cheese. On the other hand, if the treatment proceeds at the optimum part of the cycle (twenty to twenty-four hours after contamination), complete sterilization can be achieved at a temperature which need be no higher than 140° F. or 160° F. with an exposure as short as twenty seconds. Uncooked foods, even cheese, are not affected by this amount of exposure to heat.

Where the package offers resistance to permeation of steam, the steam controller is set to pulsate the steam rapidly over a range of 10° to 20°, which aids materially in sterilizing effect. A process now used for sterilizing packaged cheese involves a steam temperature pulsating between 140° and 160° for twenty seconds. To cause the steam pressure and temperature to pulsate over a selected range, a three contact pressure controller may be used. This controller has a low point contact and a high point contact with the pressure-controlled contact between.

The low point contact opens the solenoid control of the steam valve. The high point contact breaks the circuit to the steam valve and closes the circuit which opens the valve to the low vacuum pump. By throttling the steam inlet, the time of the cycle of pulsation may be lengthened. Preferably the steam flow is so controlled as to produce a pulsation cycle of two seconds minimum to about five seconds maximum. I have used successfully, a five second cycle over a range of temperature from 140° to 160° F.

In practice, the heat treatment is followed abruptly by a further vacuum which removes any residual air or other gases along with the water vapor and, by evaporation of the moisture, cools the surface virtually instantaneously, before any damaging penetration of heat into the product can occur. Relief of vacuum after this step compacts the wrapper upon the materials under treatment and attaches it securely to all portions of the surface, since the surface has not yet had time to harden. The bonding of the membrane to the surface of the material effectually excludes further penetration of air or contamination, leaving the surface of the material completely sterile and fully protected.

In practice, I ordinarily use air-free steam at 140° F. to 190° F. for a period of twenty to sixty seconds and have found that with due observance of the susceptibility cycle this will destroy or inhibit mold spores on the surfaces of the product. Other purposes of the steam treatment include the softening of the surface of the product and rendering the wrapper permeable, this being the only reason for using temperatures in the upper part of the stated range. While current experimentation has been limited to steam at 150° F. or over, there are other desirable results attainable at lower temperatures and I do not wish, except as explicitly stated in some claims, to limit my invention to temperatures of 150° F. or over.

An optional step, particularly useful for treatment of products which are heat sensitive, or so contaminated as to make treatment difficult, involves supplementing the sterilizing effect of the steam by the use of small amounts of sterilizing agents which are carried to the product by the steam and removed by the steam from the product during the final vacuum step. The most suitable additive agent thus far found is chlorine gas. Although the sterilizing effect of chlorine gas is well known, the gas has not heretofore been used because of odor and flavor which would remain in the product but for the process here involved. In the present invention, no odor or flavor remains because the chlorine seems to be completely removed with water vapor in the ensuing vacuum treatment. If chlorine is added to the steam in the proportions indicated, it will make a 160° F. steam treatment as effective in the destruction of mold spores as a treatment at 190° steam without the chlorine.

Another optional step found to have practical value is the use of mechanical pressure on the product while it is under vacuum. Desirably, the pressure is developed three dimensionally and the vacuum is relieved before the pressure is released.

The extremely high degree of vacuum desirably used to create the outward flow of water vapor to wash out fixed gases makes it desirable to use a large capacity vacuum condenser and pump which can be placed in communication with the treatment chamber and are maintained at or below 7 mm. absolute pressure. The preliminary vacuum treatment appears to have no relation to the inhibition of mold but is valuable for complete and uniform penetration of steam. High condenser capacity is required to effect quick exhaustion of steam and resultant refrigeration of the product. In practice, I use two vacuum pumps and three condensers. The first condenser is cooled with cold water and its single stage pump draws a vacuum of about 28 inches of mercury. Most of the moisture collects in this condenser. Communication with this condenser is then cut off and a pump draws residual vapor through a condenser cooled with refrigerated water and consecutively through a condenser of the direct expansion type operating at about minus 40° F. Between operation cycles, the ice water condenser is maintained fully chilled and under high vacuum. It is also designed to drain rapidly. It condenses and removes a large part of the residual water vapor before it reaches the direct expansion condenser. The vapor which leaves this condenser is preferably reduced in temperature to about 40° F. in order to prevent excessive load on the direct expansion condenser where the vapor is frozen and deposited as ice.

The invention as herein disclosed is based upon certain principles and findings of my research and is presently in commercial use. Most of these principles and findings are believed to be new and not heretofore published. Among these are the following:

(1) All mold spores go through a well-defined cycle of response to sterilizing treatment. The figures given are those which relate peculiarly to the spores of molds. Erratic results heretofore observed in attempts to destroy mold spores by sterilization have been attributed to numerous factors including the strains of the spores. The true explanation is the time cycle herein disclosed.

Within a period from four to twelve hours after contamination, mold spores are readily destroyed at 180° F., but after twelve hours following contamination the amount of temperature required for the destruction of mold spores drops off sharply, reaching a temperature as low as 150° F. at about twenty-one hours after contamination. After twenty-four hours from the time of contamination, the required temperature rises again until, at the expiration of thirty-two hours, there is substantially no mold spore destruction even at 190° F. After this time has elapsed, it becomes virtually impossible to kill the mold spores by any sterilizing or disinfectant treatment which is practicable with cheese. I have tested spores from many different sources. All of those tested appear to have substantially the identical time cycle. Regardless of the sterilizing agent used, the mold spores reach maximum susceptibility at about twenty to twenty-one hours after contamination of a moist surface, when the temperature is maintained at 65° to 70° F.

By using this principle, complete spore destruction can be achieved at sterilizing temperatures much below those regarded heretofore as essential. Complete sterility can be achieved by flash treatment of the product at 140° to 160° F., the results being comparable to treatment with steam at the boiling point of water. This is extremely important in the treatment of cheese, which is adversely affected if exposed for twenty seconds to a temperature in excess of 170° F.

In the course of making many series of thermal death point measurements, I have made microscopic examinations to determine changes in spore structure. This has led to a relatively simple method of determining for mold spores, when the spores reach the lowest point of resistance. I find that when mold spores are placed on a moist nutrient surface and maintained at 65° F. to 70° F. they show the first evidence of swelling at the end of sixteen hours. After eighteen hours, short protrusions appear. At twenty-one hours, protrusions have extended to a length equal to about four times the diameter of the spore, and the beginning of mycelia is visible. At the end of twenty-four hours, the spores have developed distinct mycelia which thereafter spread rapidly. New spores do not appear until more than forty-eight hours have passed. Paralleling these observations, a drop in death point is found at sixteen hours. The lowest thermal death point is found to correspond with the first appearance of mycelia. Thereafter, the death point rises and no decline has been found thereafter. Cheese mold is unkillable by any useful process after about thirty hours' incubation at 65° to 70° F. At lower temperatures, this time is longer.

In order to ultilize the decline of death point, a product being packaged must be kept free of inoculation until the single exposure incidental to packaging. It must then be held, after enclosure in an impermeable wrap or package, at a suitable temperature for mold germination for a predetermined length of time. At the correct time, a minimum heat treatment or equivalent, will produce complete sterility of the surface.

(2) My preferred method of sterilizing has no limitation as to transparency of package, and is applicable to sealed packages after boxing. Uniform surface heating without any measurable lag and without regard to the transparency of wrap, or shape of the package, is inherent in this process. Both process and equipment for its use are believed to be entirely novel and are, therefore, hereinafter described in detail. Boxes, paper, wood and wrapping materials such as plastic rubber-like films offer practically no resistance to the flow of steam if fixed gases are absent and do not interfere with substantially uniform and instantaneous surface heating or cooling. If a product containing water is subjected to vacuum at an absolute pressure which is less than the vapor pressure of free water in the product at its then temperature, the product evolves water and becomes colder. The volume of water vapor given off is great with respect to volume of fixed gases and washes out these gases to an extent far below that obtainable by vacuum alone. If, following the elimination of fixed gases, steam is admitted about the product, the steam will instantly permeate all space not occupied by solids and will create a surface temperature which is uniform throughout and which corresponds to the absolute pressure maintained.

The quick permeation of wood, cardboard paper and wrapping materials, by steam following extreme evacuation beyond the vapor tension of the material is a most important finding. The steam does not penetrate a hydrated colloid, but follows its surface only.

(3) I have found that several plastic rubber-like wrapping materials such as vinyl chloride and rubber hydrochloride which are nearly impermeable to gases at ordinary temperatures, become soft and permeable to steam or water vapor at about 160° F. and higher temperatures. They also become capable of passing air with the steam. Steam, admitted following evacuation to the extent described above, is found to pass through and to penetrate pervasively beneath a wrap made of such materials. This aids in securing the instantaneous heating of the surface of the solid product to the temperature of the steam.

(4) The steam is believed to release some fixed gases held to the various surfaces as molecular films. Consequently, upon subsequent vacuum withdrawal of the steam, the outgoing steam carries some fixed gases not removable by vacuum alone. Upon withdrawal of the steam by opening a large valve to a condenser, both the residual gas and the steam leave the packages and the entire contents of the vacuum receptacle become cold. The initial decline of temperature from sterilization range to a non-damaging range is practically instantaneous throughout the entire enclosure.

(5) I have found that removal of air, however complete, does not materially reduce the growth of molds, even though they are aerobic organisms. This is contrary to reports found in many scientific publications. Some natural mold species are retarded in growth by total air elimination, but they undergo a rapid adaptation to growth without free oxygen. Whatever the explanation, I find that vacuum alone has little practical value.

(6) Adhesive contact of most impervious wraps, on a solid such as cheese, prevents mold growth in the area of contact. Adhesive contact has heretofore been secured to some degree by maintaining continuous pressure on packages of cheese for long periods of time. Using the process herein described, instantaneous and complete adhesive contact is achieved on any product which has a sufficiently uniform shape. This adds insurance of keeping quality for some products having uniform outside shapes. The complete adhesion adds materially to the appearance of products packaged by this method.

Figure 12:
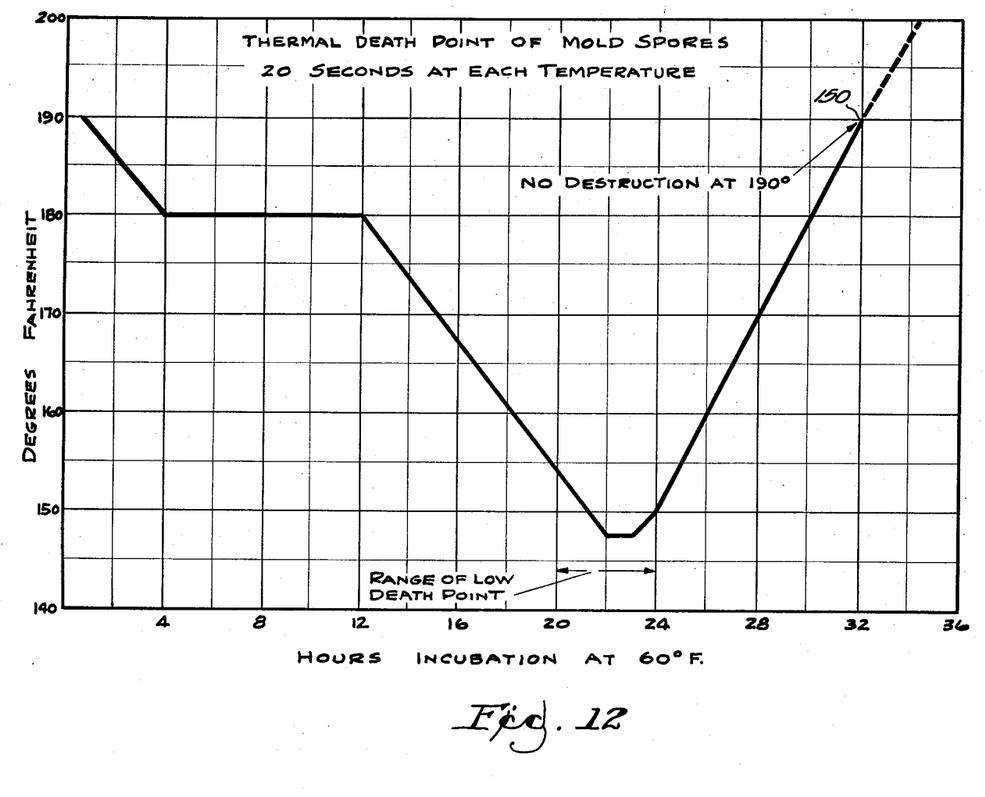
Fig. 12 is a diagrammatic view charting the effectiveness of heat treatment of mold spores in terms of temperature and time from contamination.

(7) Provided treatment is in accordance with the time cycle herein described, I have found that mold spores on the surface of a product are killed in a period of twenty seconds by exposure to air-free steam which is maintained during the twenty seconds at temperatures of about 140° to 160° F. If the treatment does not conform with the time cycle, none of the temperatures given will be adequate and it will generally be impossible to achieve complete cheese sterilization. In the chart reproduced in the drawings as Fig. 12, each of the points marked on the chart represents tests involving exposure of the contaminated surface to the temperature indicated for a period of twenty seconds in each test, with resulting complete mold spore destruction except that at the point indicated by reference character 150 at and beyond which, in point of time, no mold spore destruction was found at any practicable temperature, with or without the use of gas.

(8) For treatment of products which are heat sensitive, and at the same time contaminated with large amounts of mold, the sterilizing effect of the steam may be supplemented or augmented by the use of small amounts of added sterilizing agents to be carried by the steam and removed by it. The most suitable additive agent thus far found is gaseous chlorine. This gas, although non-toxic and harmless in small amounts, has not heretofore been applicable to the direct treatment of foods because of its odor. But, I find that if chlorine is added to the steam or admitted with it, in molecular concentration about equal to that used for the treatment of drinking water, it will intensify a 160° F. treatment so that complete destruction of mold spores will be accomplished at that temperature in twenty seconds, equivalent to what would be accomplished in the same time at 190° F. without the chlorine.

The concentration of chlorine desirably used is equivalent to that which would exist in water, if five parts per million are added to the water. The molecular concentration referred to is that which exists in the gas space or vacuum space around the solid product, and does not mean that such amount of gas enters the product. The sterilizing effect of the chlorine appears to depend upon three factors (1) the number of molecules of chlorine per unit of volume surrounding the product, (2) the absence of any protective film of air, and (3) the temperature of the steam which carries the chlorine. No measurable or even detectable amount of chlorine is absorbed into the product. If the treatment is followed by a second application of extreme vacuum the additive sterilizing gas is removed so completely that no evidence remains of its having been present. This applies only to a sterilizing agent of great volatility.

The degree of vacuum employed in the steps of the process is unusual for a vacuum packaging process. To secure the extreme degree of air removal plus a certain rate of flow, I have found necessary to use three stages of pumps consisting of a single stage primary pump followed by a two-stage high vacuum pump. These pumps, if used with a dry apparatus and without flow, would produce a vacuum well beyond $1/1000$ of an atmosphere. The boiling point, or vapor pressure of water-containing product at 60° F. is about 13 mm. absolute pressure. In order to create the outward flow of water vapor as required to wash out fixed gases, the pressure in the vacuum receiver surrounding the product is maintained at about 7 mm. absolute. Then to secure flow into the condensers and into the pump, the high vacuum pump should maintain an absolute pressure at its inlet of 2 mm. which corresponds to the boiling point of ice at 10° F. This low final absolute pressure is needed to give a practical range of capacity in an apparatus of practical size.

For practical reasons, I attempt to effect removal of all fixed gases from the product in the vacuum receiver within a short interval of time such as one to five minutes. The free gases plus about 10 to 100 volumes of attenuated water vapor are removed. The removal of the air or fixed gases in the first evacuation reaches a point beyond measurement by any means now available. It is less than the absolute pressure indicated by the vacuum gauge. The object of this extreme gas removal is not the direct inhibition of mold in the product, but is to permit complete and uniform penetration of the steam which is to be admitted in the next step.

Figure 1:
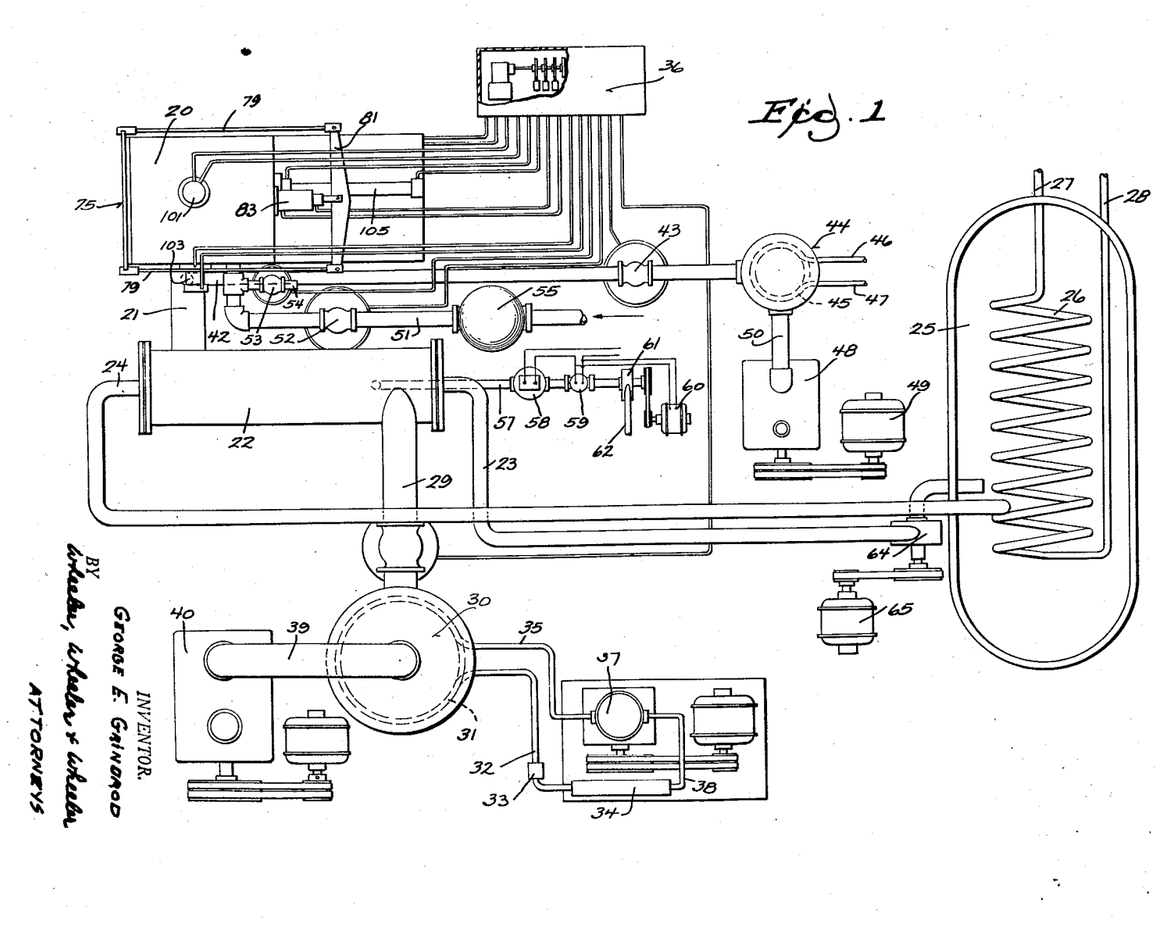
Fig. 1 diagrammatically illustrates apparatus embodying, and used in the practice of, the invention, parts being shown in plan and other parts in section.

Referring to Fig. 1, the treating chamber 20 has an evacuating connection at 21 connected by pipe 42, controlled by valve 43 with condenser 44. Condenser 44 is cooled by coil 45 which is served by water supply and return pipes 46 and 47. The vacuum in chamber 44 is maintained by a vacuum pump 48 driven by motor 49 and communicating with chamber 44 through pipe 50.

For effecting high vacuum in the treating chamber, the evacuating connection 21 also leads to a water cooled condenser 22, the water tubes 220 (Fig. 4) of which may conveniently be connected by pipes 23, 24 in circuit with a water supply tank 25 which is refrigerated by means of coil 26 having connections 27, 28 to a source of refrigerant (not shown).

From condenser 22 a further evacuating connection is supplied by pipe 29 which leads to a condenser 30 which contains an evaporator coil 31 of the direct expansion type operating in practice, at about −40° F. and having a supply pipe 32 leading through reducing valve 33 from the refrigerant condenser 34. Coil 31 freezes residual water vapor to ice at about 10° F., and defrosting of coil 31 at intervals of a few hours is desirable. This is done by conventional procedures not requiring description here. The return pipe 35, returns the evaporated refrigerant to motor driven compressor 37, which delivers the compressed vapor through pipe 38 back to the condenser.

The non-condensible gases pass from the condenser 30 through pipe 39 to the two-stage vacuum pump 40 which desirably is capable of maintaining an extremely high degree of vacuum. In practice the condensers hold the pressures at the pump inlet to about 3 mm. absolute. This pump may operate more or less continuously to keep the condenser 30 fully evacuated so that, upon the opening of valve 41 in pipe 29, a very high degree of vacuum will immediately be communicated through condenser 22 to the treatment chamber 20.

Steam connections to treatment chamber 20 are provided by means of steam pipe 51, leading from any suitable source of steam (not shown). This pipe is controlled by valve 52 and has an atmospheric connection through valve 53 which, when open, admits atmospheric air to chamber 20 through inlet pipe 54. Obviously the atmospheric connection could open directly into chamber 20 but by connecting it to the steam pipe, one connection to the chamber 20 is eliminated. The steam pipe may be provided with pressure dome 55, if desired.

Suitable means is provided for withdrawing condensate from the several condensers 22, 30 and 44. A typical arrangement is illustrated in Fig. 1 in connection with condenser 22 only. The drain pipe 57 leading from the condenser is equipped with a float switch at 58 controlling a solenoid valve 59. When accumulations of condensate lift the float to close valve 59 the circuit of motor 60 is energized to operate pump 61 for discharging condensate through pipe 62.

Where a liquid refrigerant is to be recirculated, suitable means for power circulation may be employed. This is exemplified by the use of the pump 64 driven by motor 65 and incorporated in the pipe 23 from refrigerated water tank 25 to condenser 22 so that the cooling of condenser 22 will not depend on mere gravity circulation of the coolant.

Figure 3:
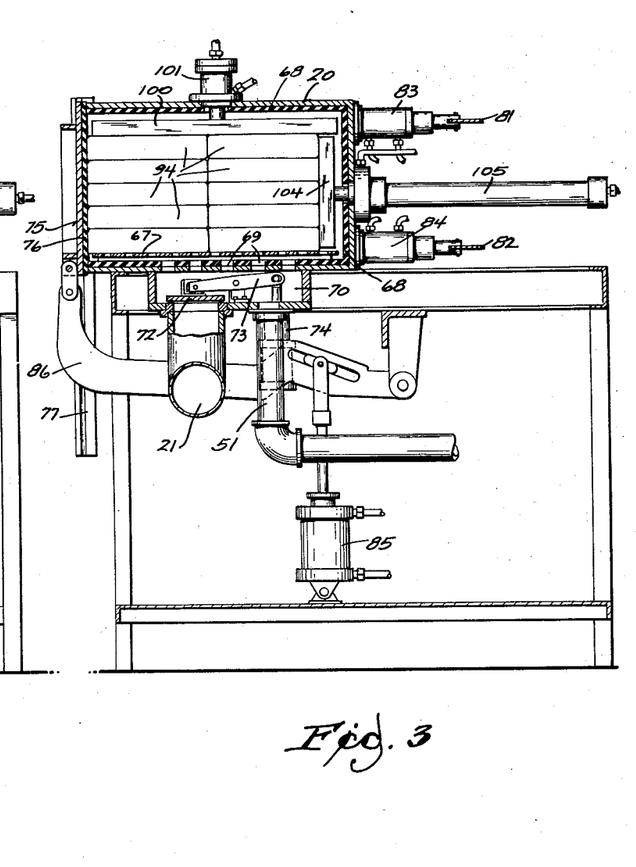
Fig. 3 is a view in longitudinal section through the chamber of Fig. 2.

Fig. 3 includes a view of the treatment chamber 20 in cross section. The material to be treated rests upon a foraminous false bottom 67. The entire chamber has a lining 68 of rubber or the like which is not only easily washed but serves as a thermal insulating means. Ports at 69 in the rubber lining at the bottom of the chamber provide free communication between the chamber and the auxiliary chamber 70 into which the evacuating pipe 21 and the steam pipe 51 open. The valve 72 is disposed within chamber 70. It fits across the end of pipe 21 and is operated by an actuating lever 73 to which motion is imparted by the ram 74.

Figure 4:
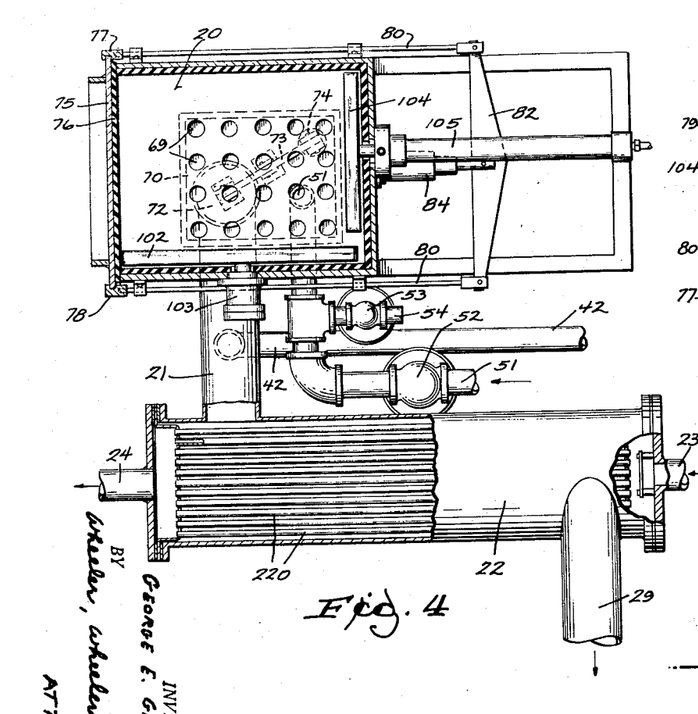
Fig. 4 is a view in horizontal section through the device of Fig. 2, portions being shown in plan.

Treatment chamber 20 has a door or gate 75 which is opened and closed by power. This door has a rubber lining 76 like the rest of the chamber and this lining also serves as a gasket to seal the door to the chamber as shown in Figs. 3 and 4.

Figure 2:
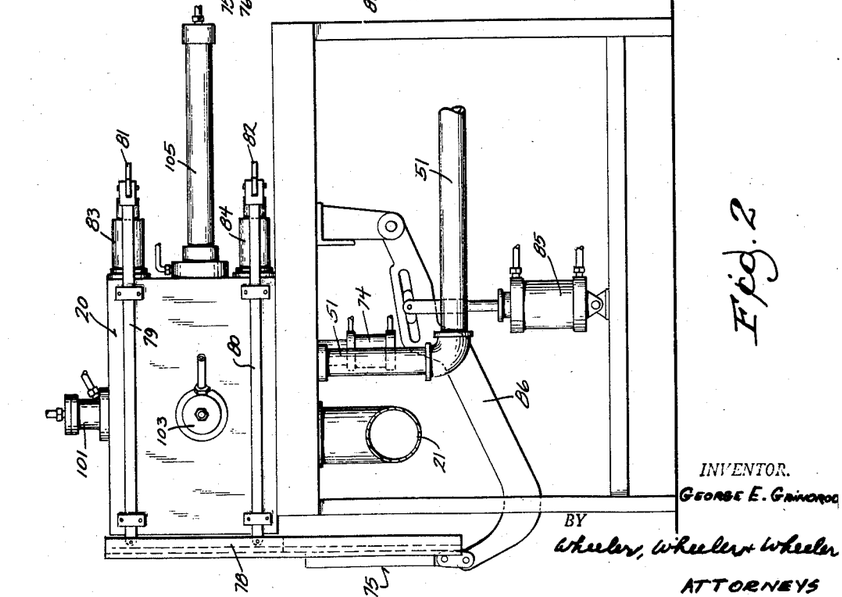
Fig. 2 is a view in side elevation of a treatment chamber organized for the application of three dimensional pressure on the work.
Figure 5:
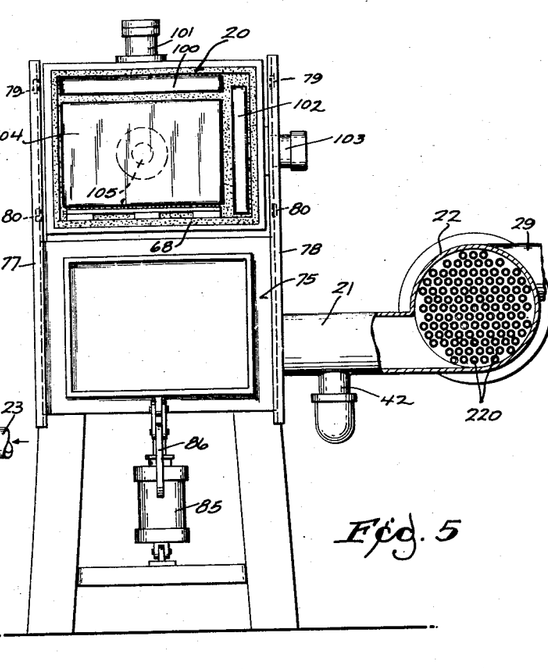
Fig. 5 is a view in end elevation of the device of Fig. 2.

The door is reciprocable in ways 77, 78 (Figs. 2, 3 and 5). These are carried by upper and lower pairs of pull rods 79 and 80 connected by cross heads 81, 82 at the rear of the chamber 20 to be moved in and out by rams 83, 84 respectively. With the cross heads in their retracted positions as shown in Fig. 2, the ways are moved outwardly from the chamber to release the gasket lining of door 75 from the end of the chamber, thereby freeing the door for vertical reciprocation in its ways 77, 78. The door 75 may thereupon be moved from the closed position of Fig. 3 to the open position of Fig. 2 by the action of ram 85 on the door actuating lever 86. With the material inserted in the chamber for treatment, ram 85 is supplied with pressure to actuated lever 86 to restore the door from open position illustrated in Figs. 2 and 5 upwardly into registry with the chamber, whereupon the rams 83, 84 are supplied with pressure to advance the cross heads 81, 82 thereby pulling the door against the end of the treatment chamber to tightly seal the entrance thereto.

Figure 6:
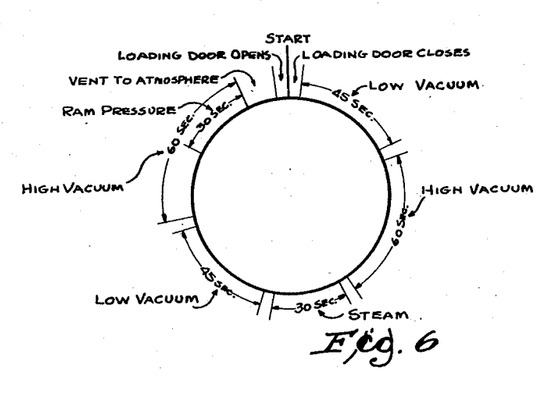
Fig. 6 is a cycle chart illustrating the desired practice of the method invention when the apparatus of Figs. 1–5 is used.

The device may be operated manually or by automatic control in accordance with the cycle shown in Fig. 6. In Fig. 1, I have diagrammatically illustrated at 36 a motor driven timer of generally conventional type having a cam shaft provided with cams for actuating switches to control the operation of the various steam, vacuum, atmospheric relief, and hydraulic ram valves as required to carry out the desired cycle.

Immediately after the starting point represented at the top of the circular diagram in Fig. 6, the loading door is closed and valves 72 and 43 are opened whereby vacuum amounting to 28 to 29 inches of mercury developed by vacuum pump 48 is communicated to the chamber. Absolute pressure in the chamber drops to about 2 inches of mercury. Gases evacuated from the chamber pass through the condenser 44 to reduce the load on the vacuum pump, condensible vapors being condensed so that the pump has to work principally on noncondensible gases. This degree of vacuum is maintained for about 45 seconds.

After a 5 second delay, valve 43 is closed and valve 41 is opened to communicate to the treatment chamber 20 the high degree of vacuum delivered by the two-stage pump 40 in condenser 30. Absolute pressure in the chamber drops to 0.2 inch of mercury. High vacuum is maintained for about a minute before valves 72 and 41 are closed.

After another brief delay, of the order of five seconds, steam from dome 55 and pipe 51 is admitted to the treatment chamber by opening valve 52. This may raise the absolute pressure in the chamber to twelve inches of mercury. Valve 52 may remain open for a period of about half a minute. In the ensuing brief dwell the pressure may drop to three inches of mercury. Valve 52 then closes and valves 72 and 43 re-open to withdraw the steam and vapor from the treatment chamber through the low vacuum condenser 44 and vacuum pump 48. After about forty-five seconds' exposure to low vacuum at about two inches absolute pressure, the chamber 20 is subjected to high vacuum by the closing of valve 43 and the re-opening of valve 41. The high vacuum remains effective at .2 inch absolute pressure for about a minute and a half, after which the chamber 20 is vented to the atmosphere by closing valves 72, 43 and 41 and opening valve 53.

The single stage primary pump followed by a two-stage high vacuum pump would, if used with dry apparatus, and without flow, produce a vacuum involving pressures less than 1/1000 of an atmosphere. In order to evaporate water from a product assumed to be at 60° F., a reduction in pressure below 13 mm. absolute is required. In order to create sufficient outward flow of water vapor to wash out fixed gases, the pressure in the treatment chamber is actually maintained at about 7 mm. absolute. In order to secure this vacuum with adequate flow into the condensers and the respective pumps, the high vacuum pump should maintain an inlet pressure of 2 mm. to 3 mm., which corresponds to the boiling point of ice at 10° F. This ice temperature is that actually maintained in my commercial apparatus by the evaporation coil 31 as above described. Thereby I remove ten to one hundred volumes of attenuated water vapor and free gases entrained therewith.

The treatment chamber has a cubic capacity of 3.6 cubic feet and can easily handle 1.5 cubic feet of packaged product, leaving 2.1 cubic feet of free space around the product. The free air capacity of the vacuum pumps is about 35 cubic feet per minute or 10 c.f.m. of pump capacity for each cubic foot of treatment chamber capacity. The vapor outlet from the treatment chamber to the condenser and vacuum pump gives unrestricted passage of 5 square inches for each cubic foot of treatment chamber capacity. This proportionate size is desirable to give a practicable rate of flow for the greatly expanded gases. Any reduction in relative flow capacity may increase required treatment time but it will be understood that there is nothing critical about these proportions.

In the particular commercial device illustrated, the single stage condenser 44 has a volume of 3.5 cubic feet and a capacity of 8000 B.t.u.'s per minute. Second stage condenser 22 has a capacity of 1600 B.t.u.'s per minute. Third stage condenser 30 has a capacity of about 600 B.t.u.'s per minute at 0° F. Time is less critical in the latter stages of evacuation and cooling, since, by the time the action of condenser 30 becomes effective or necessary, the surface of the product will already have been cooled well below the point of injury by the heat of sterilization.

All figures given are taken from a typical commercial apparatus and are reported merely by way of exemplification, without any intention that they be regarded as limiting the invention.

A major feature of the invention is the virtually instantaneous reduction of surface temperature of the product after its brief treatment at relatively high temperatures by the steam. It being impracticable to condense all of the outgoing water vapor in any one condenser within the permissible time interval, the condenser is made in three parts. Condenser 44 will remove a large part of the condensible vapors using cold water only to circulate through coil 45. Condenser 22 condenses the major part of the residual condensible vapors by means of circulating ice water. Condenser 30 removes by condensing and freezing substantially the entire remainder of condensible vapor.

The temperatures developed by the steam admitted to the treatment chamber 20 will ordinarily range from 140° F. to 190° F. depending on the time of exposure, the nature of the product, the degree of sterility required and, depending further on the optional use of a sterilizing gas in the manner hereinafter to be described. In no case is the material exposed to steam sterilizing temperatures for any period longer than is required to sterilize its surface.

Surface may be understood to mean some depth. Some penetration is certain but can not be measured. The heat must penetrate enough to kill spores which are on the surface and must at the same time remove the molecular gas film supposed to adhere to all surfaces. On cheese, the penetration is limited closely to the first evidence of reversing the emulsion or releasing visible oil. The effort is made to secure adhesion of the wrap, kill mold, and avoid more than a thin film of released oil.

Figures 9, 10, 11:
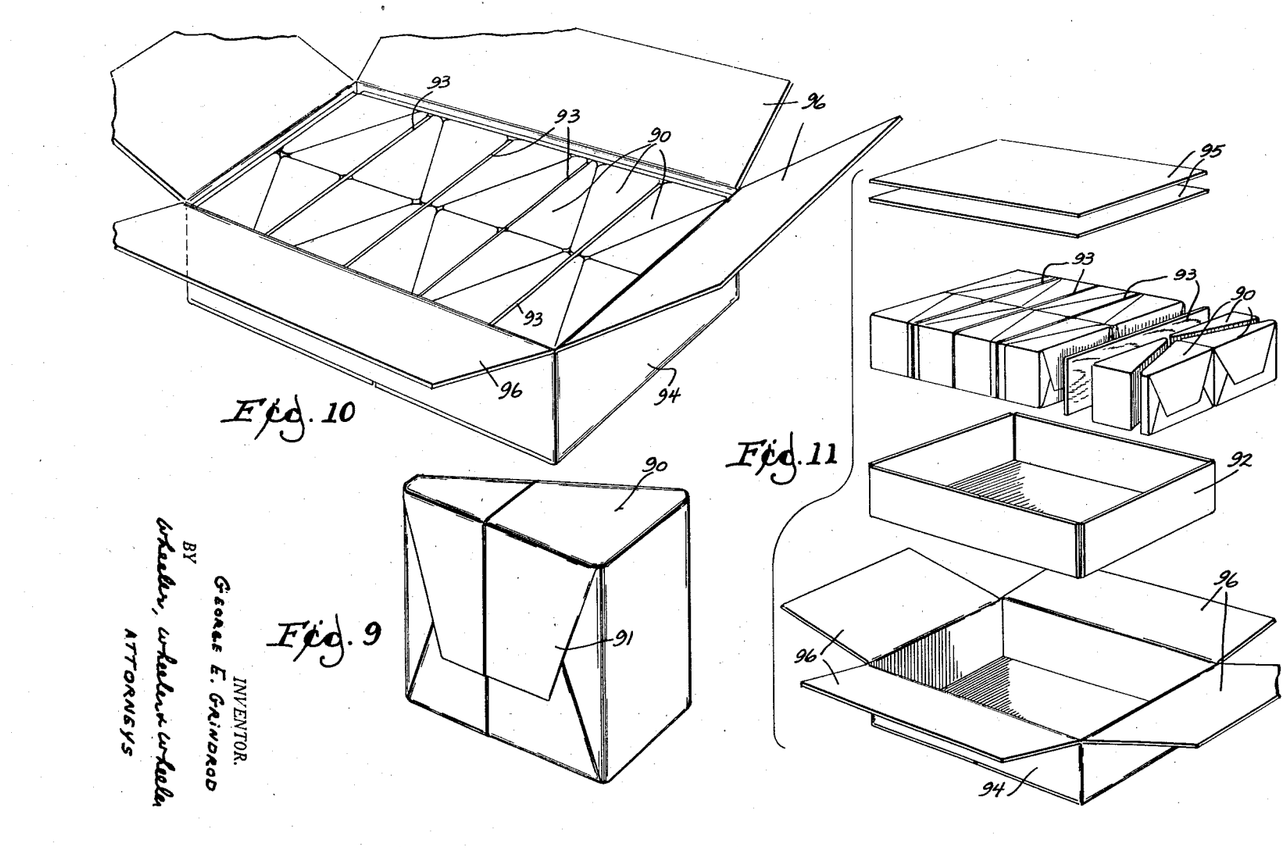
Fig. 9 is a view in perspective showing a wrapped product in readiness for treatment.
Fig. 10 is a view in perspective of an open box containing a number of packages such as that shown in Fig. 9.
Fig. 11 is a view showing separately the various component parts of the box and contents.

As already indicated, the product under treatment may be already wrapped and completely boxed in advance of treatment. Fig. 9 shows a wedge-shaped package 90 resulting from enveloping a block of cheese of the indicated shape in a wrapper 91 of plastic film. This wrapper is desirably left unsealed at the commencement of the process since it inherently becomes tightly bonded to the material during treatment as a result of the heat and vacuum and oils or other juices excreted from the cheese or other produce during treatment.

In practice, a number of the wrapped blocks 90 are fitted together to make a unit of rectangular form. Four of the wedge-shaped blocks comprise such a unit. The four block unit is then assembled with other similar units in a tray 92, dividers of soft wood fiber board or other suitable material being used at 93 between units. The tray is then placed in a carton 94 and the units and dividers are covered by one or more filling sheets 95 after which the cover flaps 96 of the carton will be closed in the usual way. It will require some pressure to close the flaps over the filler plies, the latter being used to assure the complete filling of the carton, with a view to the desired use of pressure on the carton in a manner which is optional and not yet described.

When one or more cartons of this type are placed in the treatment chamber, the vacuum and steam readily penetrate the wall of the sealed carton and also penetrate to the surface of all portions of the carton contents. The wood dividers 93 are used to facilitate such penetration, having been found to be readily permeable both by the vacuum and the steam. In practice, the cheese packages 90 contain about eight ounces each and the cheese contents are wrapped in a flexible membrane of vinyl chloride of about .001 inch in thickness. The total amount of cheese per carton 94 is therefore about ten pounds.

As already indicated, the unsealed wrapping web 91 readily permits air and water vapor and fixed gases to escape from the individual packages during the initial vacuum treatment. During the subsequent application of pressure, the steam would tend to seal the wrappers but for the fact that these webs become highly permeable to steam and water vapor and other gases at about 160° F. and higher temperatures. Accordingly, the steam passes right through the wraps to act on the surfaces of the solid product.

During the ensuing vacuum operation, the steam and water vapor and any remaining gases pass outwardly through the wrapper and concurrently chill the product to effect instantaneous reduction of its surface temperature from a sterilizing range to a non-damaging range. Meantime the wrapper has become adherent to the surface of the product and, upon cooling, has become non-permeable, thereby maintaining the surface sterility achieved during heat treatment. When the vacuum is released, atmospheric pressure molds the wrapper into absolute conformity with the product to maintain it adhered to the entire surface, regardless of minor irregularities in that surface.

The process may be used not only on cured cheese but also upon soft cheese curd. It has the advantages of complete removal of all air and gases from the curd and the closing of internal voids. As in the treatment of cheese or meat, the surface of the block of curd is left sterile and the wrap is effectively adhered to the curd over its entire area and remains thus adhered without continued pressure. The cheese may thereupon be stored without requiring pressure during storage.

In order to use this invention on cheese curd, the freshly made curd will ordinarily be placed into a block of desired size and shape which will be wrapped with vinyl chloride or other membrane as herein disclosed. The wrap is left unsealed but has lapping margins. If the wrap is as thin as .005 to .001 inch in thickness, folds or creases will be immaterial because of the pliable nature of the thin material. In treating curd, it is particularly desirable to use mechanical pressure as presently to be disclosed, the curd preferably being free to expand during the initial vacuum treatment for the release of contained gases, and having its form restored by pressure before completion of the second vacuum step. Preferred steam treatment of raw curd is at 180° F. to 200° F. Advantages include production of cheese blocks of uniform density which can be cut readily to identical weights.

If mold develops on cheese during the curing, the block will be progressively seeded with spores in all stages of development. If such cheese is used for packaging or slicing and packaging, complete sterilization of the package is generally impossible. The process of controlled death point decline does not produce total sterility with any known or practicable treatment. Consequently, contaminated blocks are not used for packaging, and precautions are taken to prevent such mold from being present during the curing of the cheese. In the process of cheese manufacture, the curd is placed in hoops and pressed and drained for several hours, then removed from hoops and wrapped in plastic covering and placed in rectangular boxes for curing. The cheese has had possible surface contamination at two times, or in the two transfers. The curd as freshly pressed into boxes, is not damaged by a temperature treatment of twenty seconds at 200° F. since it does not melt as does finished cheese. The vacuum steam treatment as described is applied to the boxed curd, but at a high temperature. This, together with pressure applied while under vacuum, is effective in destroying the contamination incidental to boxing the curd.

When the above described process is applied to blocks of fresh cheese curd, a distinctive product is the result.

The removal of entrained gases, cracks and mechanical voids causes an average increase of density of about 3.6%. When the internal rams operated during vacuum treatment are used as described, the blocks, which are usually made to dimensions of 11 inches x 14 inches x 3.5 inches thick, contract along the 3.5 inch dimension and become about 0.125 inch thinner. When a block is cut, the distinction from similar blocks prepared by the methods heretofore used is evident in that cracks and holes are absent. The cheese has a uniform texture.

The outward appearance of a block of cheese prepared by my method is distinctive when transparent wrap materials are used. The adhesion of a transparent wrap is so complete that the lines of fold are not distinguishable, and the wrap appears as a part of the cheese surface. The cheese appears smooth as though it were a hard substance polished. The plane of contact between the wrap and the cheese is not easily distinguishable. The membrane does not pull away from the curd when pressure is released, which is a distinction from cheese wrapped by the pressure methods theretofore used. Adhesion is obtained instantaneously when vacuum is relieved and atmospheric pressure forces the wrap against the oil film on the cheese surface. In the case of uncured cheese, the adhesion may be broken a couple of months later due to accumulations of gas resulting from curing. Ootherwise adhesion remains in effect indefinitely regardless of the choice of wrapping film and without mechanical maintenance of pressure.

Reference has been made to the optional use of a pressure step during treatment, this step desirably being employed during the latter part of the second application of vacuum to the product. In the preferred practice of the invention, this step is employed. Various rams operate pressure plates within the treatment chamber 20. Fig. 5 shows all three of the pressure plates desirably used.

One pressure plate 100 is at the top of the treatment chamber and is operated by a ram 101. Another pressure plate 102 is at the side of the treatment chamber and is operated by ram 103. The third pressure plate 104 is at the rear of treatment chamber and this is operated by ram 105 which has a relatively long stroke so that it may be used not only to apply pressure but to eject the work from the chamber when the door of the chamber is opened.

Rams 101 and 103 have relatively short strokes, since the boxed product is only slightly compressible. For the same reason, the movement of the rear pressure plate 104 is relatively slight during compression of the box. Its greater length of movement is utilized only for ejection.

As shown in the cycle diagram, Fig. 6, the rams are operated to subject the work to pressure only during the latter part of the second vacuum treatment. The mechanical pressure on the product while the high vacuum continues aids in discharging all residual vapors and gases from the packages and contents and it further aids in reshaping the packages and contents and maintaining their form so that the subsequent relief of vacuum and application of atmospheric pressure will force the wrapper into intimate contact with relatively regular and smooth surfaces of the contents. While the cycle diagram shows the mechanical pressure released coincidentally with the relief of vacuum, in practice I maintain the mechanical pressure until after the vacuum has been completely relieved.

In my opening summary of the invention, I referred to a second optional feature involving the use of chlorine gas as an aid to and accelerator of sterilization. The addition of a very minute quantity of such gas to the steam so accelerates the destruction of surface organisms that a steam treatment at 160° F. is just as effective for sterilization as steam treatment at 190° F. without the addition of chlorine. The steam not only diffuses the gas into immediate and intimate contact with organisms on all surfaces of the product but seems to assure, by reason of its temperature, an unusually effective functioning of the gas to reduce the amount required. Moreover, when the steam is withdrawn during the second application of vacuum, the gas is withdrawn with it so completely that no odor of gas remains.

In practice, I have used a molecular concentration of chlorine to effect complete destruction of spores in twenty seconds by using the same concentration as the chlorine would have if added to drinking water in the proportion of five parts per million.

Experiments in the use of chlorine gas without the use of steam show that larger proportions of chlorine are required and that chlorine remains in the food in sufficient quantities to be detected both by odor and by flavor. When used as herein disclosed, there is no evidence that any chlorine whatever remains in the food. It cannot be detected in any known way, nor is there any residual preservative effect. Growth of mold spores on a surface treated in accordance with the present invention will readily occur if the surface is reinoculated. The effect of the process is therefore exclusively a matter of sterilization and not preservation.

According to my experiments, the range of effectiveness of chlorine against mold at 160° F. begins at about the equivalent of about two parts per million of chlorine and there is a considerable margin of safety if chlorine is used at about five parts per million. These concentrations correspond to 50–145 milligrams per cubic foot of space in the treatment chamber.

The use of chlorine as an additive to the steam accelerates the sterilizing action of the steam. But, if mold spores have been inoculated on the surface of the product, and have incubated beyond the interval for death point decline as hereinbefore described, then such spores cannot be killed by any practicable amount of chlorine. The resistance to chlorine increases parallel to the resistance to heat. Thus, attempts at sterilizing the surfaces of foods by chlorine might prove to be failures unless account is taken of the rise of resistance shown by mold spores after certain lengths of time.

An advantage of being able to treat cheese at 160° F. lies in the fact that the appearance of the cut surface is not affected adversely by treatment at that temperature. Some varieties of cheese and other products are not adversely affected in appearance even at higher temperatures. However, the 160° F. temperature is usable on all kinds of cheese and most other products which might be treated according to this process. This relatively low temperature will deal with any concentration of mold which I have encountered if the chlorine gas is used with the steam. Moreover, the vacuum removal of the steam and chlorine gas will effectively and completely remove all gas from the product even if the amount of gas employed is greatly in excess of the proportions recommended herein.

Figure 7:
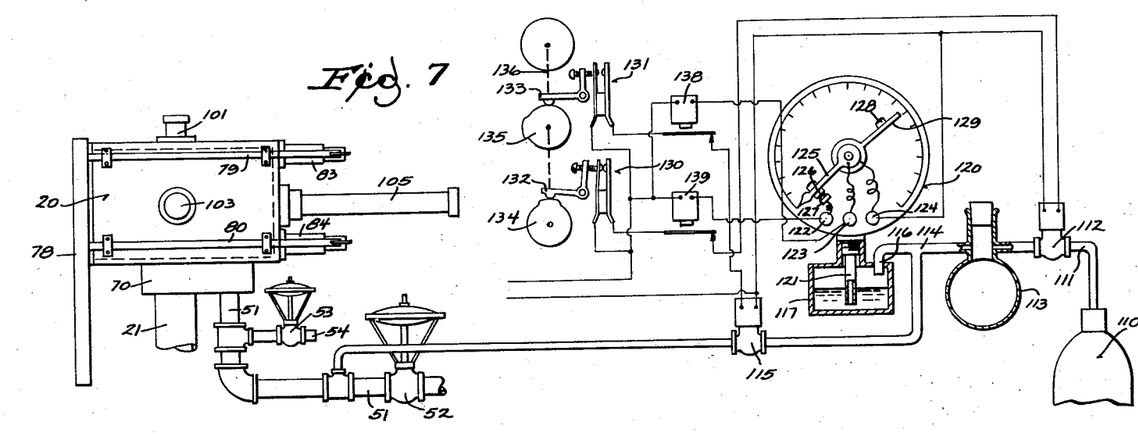
Fig. 7 is a diagram supplemental to Fig. 1 showing the additional apparatus used when a sterilizing agent such as chlorine gas is used in the vacuum-steam process.

For the chlorine treatment, the preferred apparatus is diagrammatically shown in Fig. 7.

The chlorine gas is supplied from container 110 through pipe 111 controlled by solenoid valve 112 to the gas measuring flask 113. From this flask pipe 114 leads, subject to the control of a valve 115, either directly to the treatment chamber 20 or to a pipe which enters the chamber, actual connection in practice being to the pipe 51 at a point near such chamber.

A pipe 116 branching from pipe 114 leads to an oil reservoir 117 upon which is mounted the control gauge in the reservoir so that the gauge is operated by oil 120. The stem 121 of the gauge extends below oil level in the reservoir so that the gauge is operated by oil pressure determined by the pressure of the gas admitted to the surface of the oil through pipe 116. The gauge has electrical connections at 112, 123 and 124. It has a pressure operated arm or pointer at 125 which is electrically connected with terminal 123 and carries a moving contactor 126 normally engaged with a fixed contact 127 connected with terminal 122.

At a predetermined position of clockwise movement of the pointer 125, the contactor 126 thereof will engage contact 128 carried by an adjustable arm 129 connected with terminal 124.

Figure 8:
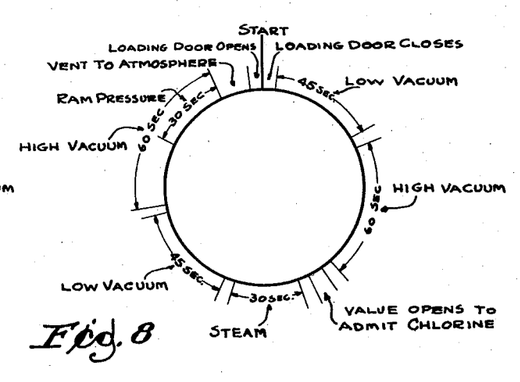
Fig. 8 is a cycle chart showing the preferred practice of the method when the apparatus diagram illustrated in Fig. 7 is added to that of Figs. 1–5.

Switches 130 and 131 are operated by cam followers 132 and 133 respectively, these being controlled by cams 134 and 135 on the sequence timer shaft 136. The operation of the sequence timer must be synchronized with the timing of the opening and closing of the valves to perform the steam and vacuum cycle already described and diagrammatically illustrated in Fig. 6. Fig. 8 shows the preferred cycle when chlorine gas is used with the steam.

Beginning with the flask 113 full of chlorine gas at atmospheric pressure, valves 112 and 115 being closed, the rotation of cam 135 will close the switch 131 which will open the valve 115. As shown in the cycle diagram, Fig. 8, this occurs during an interval of high vacuum. The gas will therefore flow from the measuring flask 113 into the treatment chamber and this will continue until the pointer or arm 125 has moved from the position shown in Fig. 7 to a position in which its contact 126 engages the adjustably fixed contact 128. The closing of the circuit between contacts 126 and 128 will energize relay 138 to break the circuit to valve 115, whereby such valve will close. A volume of gas representing a predetermined part of the volume of flask 113 will have moved into the treatment chamber along with steam which is admitted at approximately the same time.

Further rotation of the timer shaft 136 permits switch 131 to open and close switch 130. This closes the circuit to solenoid valve 112, whereby the measuring flask is re-charged with gas from reservoir 110. Restoration of gas pressure on the oil in chamber 117 returns pointer 125 back to the position illustrated in Fig. 7. Upon engagement of its contact 126 with fixed contact 127, relay 139 is energized to break the circuit to valve 112 thereby allowing this valve to close. The gas metering apparatus is thus restored to readiness to deliver another measured quantity of gas for the next cycle of operation.

In practice, a flask 113 of about 250 cc. capacity will supply the range of volumes of a typical commercial apparatus having a treatment chamber of 3.5 cubic foot total capacity for treatment of a charge of 1.5 cubic foot of product as above described. This will handle 100 pounds net weight of packaged product per cycle or about 1000 pounds per hour.

The basic principle which appears to be involved in the successful use of a sterilizing gas with the above described vacuum-steam process is that steam following a high vacuum breaks the bond which holds fixed gases to various surfaces. Vacuum alone will not remove the odor of chlorine from a package or from a food surface. Minute amounts, probably a molecular film cling to surfaces through any degree of evacuation. But, following a steam treatment and a vacuum exhaustion beyond the vapor tension of the product, the odor is eliminated. Controlled surface action without penetration is practicable with any desired volatile agent.

The method of using sterilizing gases in conjunction with steam and vacuum applies only to food products which are essentially hydrated colloids. Dry materials, powdered materials and the like are not adapted to treatment by the steam method. A water-containing product which presents a solid surface is adapted to the treatment.

Other gases than chlorine may be used. Hydrochloric acid in gaseous form may be applied to produce a transient acid condition on the surface of any water-containing solid. This gas has no toxicity and if applied by ordinary methods, would simply acidify a surface of a product such as cheese or meat. It would have no useful effect. But, if applied in the above described process, it has a distinct sterilizing effect during the limited time it is applied. It is then withdrawn with the steam.

Whether the gase used is chlorine or hydrochloric acid, or whether bromine, fluorine or iodine or other vapors or gases are used either for sterilization or for some other purpose, the method principle herein described appears to have generic application, the steam making penetration and treatment effective and the ensuing vacuum operating on residual water vapor to withdraw the treating gas more completely than would otherwise be possible.

It is very important to understand the principles involved in the high vacuum treatment, since the maximum limit of absolute pressure is a variable depending upon the vapor pressure of the product and this in turn depends mostly upon the temperature of the product. We have two conditions or limits. (1) The absolute pressure has to go below the vapor pressure of the product, and (2) it has to stay there maintaining outward flow for a certain time interval. In the commercial operation of the process, defective adhesion of wrap becomes visible whenever the first vacuum has been incomplete, or the time of application too short. In practice, also, the temperature of the cheese is carefully controlled. If it is too cold, air removal will be incomplete with a degree of vacuum and a time interval which would have been sufficient at a higher temperature. The preferred temperature is 60° F. for packaged cheese. The requirements cannot be defined in terms of absolute pressure only. The other factors have to be considered.

All products treated for sterilization as hereinbefore described are preferably transferred directly to refrigerated storage upon discharge from the process. Prompt chilling to 40° F. or lower has a material effect upon assurance of sterilization, even though the product is later stored at room temperature. For reasons not fully understood, spores sometimes revive if they are placed at a temperature favorable to growth. Complete chilling for the first forty-eight hours after treatment adds a factor of safety and is a preferred commercial practice.

I claim:

1. A method of surface sterilizing a hydrated food product in block form and which is freshly contaminated with mold spores, having previously been free thereof, which comprises loosely wrapping the product in a membrane which is permeable to water vapor and other gases in the presence of heat, before any of such spores show substantial mycelia growth, subjecting the wrapped product to vacuum sufficiently high to vaporize its water content at atmospheric temperatures, the water vapor escaping through the loose wrapper, the vacuum induced withdrawal of water vapor carrying air and other fixed gases from the product, immediately exposing the wrapped product to steam at a temperature at least as great as approximately 160° F., the vacuum being relieved and the steam penetrating the wrapper to the surface of the product therein contained, continuing the exposure to steam for a time only sufficient to heat the surface of the product substantially to the temperature of the steam without substantial penetration below the surface, thereupon exposing the product for a second time to high vacuum sufficient to withdraw water vapor from the product and abruptly to evaporation-cool the product, and exerting pressure upon the wrapper and against the product to seal the wrapper and force it into intimate contact with the product before completion of the second vacuum exposure to aid in discharging residual vapors and re-shaping the product.

2. The method of claim 1 in combination with the further step of exposing the product to a sterilizing fluid between the periods of exposure to vacuum, the sterilizing fluid being substantially completely removed from the product during the second exposure of the product to vacuum.

3. The method of claim 1 in which the product under treatment is not only wrapped but boxed prior to its first exposure to vacuum and continues boxed throughout the vacuum and steam treatment aforesaid.

4. The method recited in claim 2 in which the fluid comprises chlorine gas.

5. A method of surface sterilization of a block of food product containing water and air and initially sterile and which has become superficially contaminated with mold spores, which method comprises the steps of incubating the contaminating spores until germination commences, and before any of such spores develop mycelia of substantial length subjecting the product and germinated spores to a vacuum so high as to vaporize free water content of said product, the flow of vapor effecting withdrawal of entrained air from the product, exposing the evacuated product and spores to steam at a temperature at least as high as approximately 150° F. for a brief period sufficient to heat only the surface of the product, and aseptically sealing the product in an enclosure.

6. The method of claim 5 in combination with the subsequent step of again subjecting the product to vacuum after the steam heating step, and the step of exposing the product to chlorine gas during the exposure of said product to steam, the said gas being withdrawn from the product by the vacuum to which the product is subsequently subjected.

7. A method of surface sterilizing cheese in block form containing water and air and having its initially sterile surface freshly contaminated with mold spores, said method comprising incubating the spores on said surface at temperatures approximating 65° to 70° F. for a period of 4 to 30 hours, within which period spore growth commences, and before any of such spores develop mycelia of substantial length subjecting the cheese to vacuum at an absolute pressure which is below the pressure at which water will boil at the temperature of the cheese whereby to vaporize and withdraw water from the cheese, the water vapor entraining and carrying off air from the cheese, then exposing the cheese and spores to steam at a temperature of at least 150° F. and sufficiently below 212° F. to avoid damage to the cheese, the duration of such exposure to steam being materially less than one minute and of the general order of twenty seconds to sterilize only the surface of the cheese substantially at the temperature of said steam.

8. The method set forth in claim 7 in combination with the further steps of first wrapping said cheese in a film with lapping margins heat sealable within the time and at the temperature provided by said exposure to steam, said firm being wrapped about the cheese but unsealed during said step of subjecting said cheese to vacuum, and sealing said lapping margins and subjecting the cheese to another vacuum exposure, whereby the steam vapor is withdrawn and the cheese is abruptly evaporation-cooled.

References Cited in the file of this patent

UNITED STATES PATENTS

| Re. 23,195 | Brasch | Feb. 7, 1950 |
| 120,355 | Wells | Oct. 24, 1871 |
| 1,180,895 | Way et al. | Apr. 24, 1916 |
| 1,754,251 | Yates | Apr. 15, 1930 |
| 2,170,196 | Grindrod | Aug. 22, 1939 |
| 2,471,867 | Fisher et al. | May 31, 1949 |
| 2,540,815 | Eldredge | Feb. 6, 1951 |
| 2,721,941 | McMaster et al. | Oct. 25, 1955 |

OTHER REFERENCES

Tanner: Bacteriology, 3rd ed., New York, 1938, pp. 152–154, 158–159 and 182–185.

Porter: Bacterial Chemistry and Physiology, New York, 1946, pp. 185 to 187 and pp. 118–119.